United States Patent [19]

Srivastava

[11] Patent Number: 4,469,942
[45] Date of Patent: Sep. 4, 1984

[54] MEANS AND METHOD FOR CALIBRATING A PHOTON DETECTOR UTILIZING ELECTRON-PHOTON COINCIDENCE

[75] Inventor: Santosh K. Srivastava, La Canada, Calif.

[73] Assignee: The United States of America as represented by the United States National Aeronautics and Space Administration, Washington, D.C.

[21] Appl. No.: 358,088

[22] Filed: Mar. 15, 1982

[51] Int. Cl.³ .................... G01J 1/42; G01D 18/00
[52] U.S. Cl. .................... 250/252.1; 250/251; 250/372
[58] Field of Search .................... 250/252.1, 251, 372; 356/311

[56] References Cited

U.S. PATENT DOCUMENTS

| | | | |
|---|---|---|---|
| 3,174,036 | 3/1965 | Alexeff | 250/372 |
| 3,211,913 | 10/1965 | Bulmgren | 250/252.1 |
| 3,645,627 | 2/1972 | Brody et al. | 356/243 |
| 3,944,834 | 3/1976 | Chuan et al. | 250/372 |
| 4,060,726 | 11/1977 | Luitweieler | 250/252.1 |

Primary Examiner—Alfred E. Smith
Assistant Examiner—Carolyn E. Fields
Attorney, Agent, or Firm—Paul F. McCaul; John R. Manning

[57] ABSTRACT

An arrangement for calibrating a photon detector particularly applicable for the ultra-violet (UV) and vacuum ultra-violet (VUV) regions is based on electron photon coincidence utilizing crossed electron beam-atom beam collisions. Atoms are excited by electrons which lose a known amount of energy and scatter with a known remaining energy, while the excited atoms emit photons of known radiation. Electrons of the known remaining energy scattered in a particular direction are separated from other electrons and are sensed and counted. Photons emitted in a direction related to the particular direction of scattered electrons are detected by a detector to serve as a standard. Each of the electrons is used to initiate the measurement of a time interval which terminal with the arrival of a photon exciting the photon detector. Only the number of time intervals related to the coincidence correlation and of electrons scattered in the particular direction with the known remaining energy and photons of a particular radiation level emitted due to the collisions of such scattered electrons are counted. The detectors calibration is related to the number of counted electrons and photons. Once calibrated the photon detector is useable to calibrate other photon detectors.

24 Claims, 3 Drawing Figures

MEANS AND METHOD FOR CALIBRATING A PHOTON DETECTOR UTILIZING ELECTRON-PHOTON COINCIDENCE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention generally relates to photon detection and, more particularly, to the calibration of a photon detector by electron-photon coincidence.

2. Description of the Prior Art

The need for the calibration of photon detectors of unknown efficiencies is well known. Various instruments and techniques have been developed for the calibration of such detectors in the various regions of the spectrum, such as the visible, ultraviolet (UV) and vacuum ultra-violet (VUV) regions. Many of these instruments are quite complex and very expensive. Also, they are not useful at very low light levels. For example, the instrumentation which employs the synchrotron radiation technique and which can be used below 1000 Å is very expensive and complex. Also, since therein the radiation intensity is very high, it cannot be used for low light level measurements.

A need therefore exists for a new arrangement for calibrating a photon detector for low light level measurements, particularly in the UV and VUV regions.

OBJECTS AND SUMMARY OF THE INVENTION

It is a primary object of the present invention to provide a new improved arrangement for calibrating a photon detector.

Another object of the invention is to provide a new improved, relatively inexpensive, and simple arrangement for calibrating a photon detector at low light levels.

A further object of the present invention is to provide a relatively inexpensive arrangement for calibrating a photon detector, particularly in the VUV and UV regions.

These and other objects of the invention are achieved by providing a photon detector calibration arrangement based on electron-photon coincidence, utilizing crossed electron beam-atom beam collisions. The arrangement includes a photon detector, whose input solid angle is known, but whose efficiency to photons of particular radiation is to be determined. Once its efficiency is determined, it can serve as a standard for calibrating other photon detectors whose input solid angles are known, but whose efficiencies in detection of such photons are not known.

To create the standard i.e. determine its efficiency, electrons of a selected energy from an electron gun are made to collide with and bombard a beam of selected atoms, e.g. He atoms. As a result, the atoms are excited and emit photons of particular radiation, while each bombarding electron, which caused the emission of a photon, loses energy. Bombarding electrons which have lost a particular amount of energy, hereafter referred to as the exciting electrons, produce said photons at a coincidence correlateable time relationship. Alternately stated, there is a direct correlation between the production time of photons and the exciting electrons. Exciting electrons, scattered in a selected direction, are separated from other electrons and are sensed and counted. For each photon detected by the standard photon detector after an exciting electron has been sensed, a pulse is produced and is counted. Separate counts are produced for photons arriving at different times from the times of arrival of the exciting electrons. Only the count of photons detected at known time intervals after the detection of exciting electrons, is of importance. Based on said count and the exciting electron count, the efficiency of the standard photon detector is determined. Once this efficiency is obtained, the standard photon detector is useable to calibrate other photon detectors.

DETAILED DESCRIPTION OF THE DRAWINGS

In the following description, the invention will be described in connection with a particular embodiment. However, as will be appreciated, the invention is not intended to be limited thereto.

Figure 1:
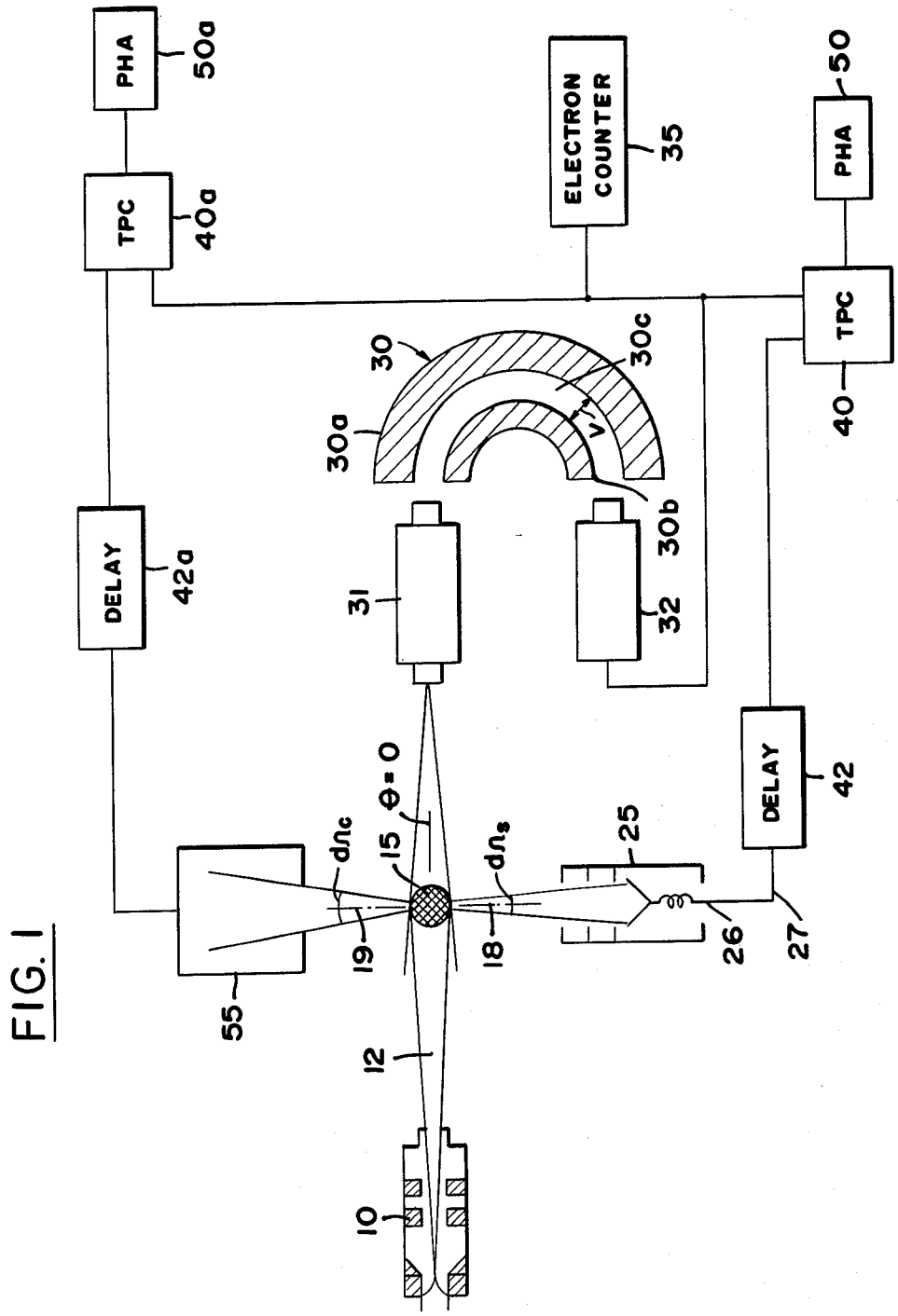
FIG. 1 is a diagram useful in explaining the calibration of a photon detector to serve as a standard for other photon detectors based on electron-photon coincidence correlation.

Attention is first directed to FIG. 1, which is a diagram of an embodiment of the invention. In accordance with the present invention, an electron gun 10 provides a beam of electrons 12, of a selected energy, e.g. 100 eV. Also provided is a beam of atoms 15 (directed into the page as seen in FIG. 1) of a selected gas, e.g. He. The He beam 15 is trimmed down so that 584 Å radiation is not appreciably absorbed by it. The two beams i.e. the electron beam 12 and the He beam 15 collide at 90°. As a result of the collision, He atoms are excited and photons are emitted. Also, exciting electrons are scattered at an angle with respect to the incident electron beam 12. For the particular example, photons of 584 Å are emitted by electrons which have lost 21.2 eV, which is equal to the excitation energy of a He atom from ground state to the 2'P state. Thus, the exciting electrons, which caused the emission of 584 Å photons, are scattered with a remaining energy of 100 eV−21.2 eV=78.8 eV. Hereafter, however the 78.8 eV electrons will be referred to as 79 eV electrons.

As is known, the 79 eV electrons scatter in all directions, and the emission of the 584 Å photons is non-isotropic. That is, more 584 Å photons are emitted in some directions than in other directions. For example, while most 79 eV electrons scatter at an angle $\theta = 0$, a considerable amount of 584 Å photons scatter in directions perpendicular to $\theta = 0$. These two opposite perpendicular directions are represented in FIG. 1 by numerals 18 and 19.

In accordance with the present invention, in order to calibrate a photon detector of unknown efficiency for 584 Å photons, and which may have low transmission properties, it is first necessary to determine precisely the efficiency of a photon detector which can then serve as a standard. Once the efficiency of the standard photon detector to 584 Å photons is known, the efficiency of the other photon detector can be determined. This is based on the relationship or correlation between scattered 79 eV electrons at a particular value of $\theta$, such as $\theta=0$, and a direction in which a relatively large number of 584 Å photons are emitted such as direction 18 for electrons scattered at $\theta=0$.

In FIG. 1, numeral 25 designates a photon detector of relatively high transmission for 545 Å photons, which is to serve as the standard photon detector whose efficiency is first to be determined. The standard photon detector 25 is positioned to receive all photons, including 584 Å photons which are scattered in direction 18 through its input solid angle $d\Omega_s$. The calibration of the standard detector 25 is performed by sensing only the scattered 79 eV electrons in direction $\theta=0$, and the 584 Å photons which were emitted as a result of these electrons and which were sensed by the standard detector and passed through it.

To select only the 79 eV electrons, scattered in the direction of $\theta=0$, the arrangement of the present invention includes an electron analyzer, designated in FIG. 1 by numeral 30. Basically, it consists of two semihemispherical members 30a and 30b, and input and output electron guides 31 and 32, respectively. The members 30a and 30b are spaced apart to provide a path for electrons, designated 30c. Members 30a and 30b of analyzer 30 are connected to an appropriate voltage source (not shown) to produce a preselected voltage difference between them, which is designated as V.

In operation, the input electron guide 31 is positioned along the direction $\theta=0$. Thus, all electrons in this direction effectively enter analyzer 30. However, by the proper selection of V only electrons with an energy of 79 eV pass through the entire path 30c to the output electron guide 32. Electrons with energies other than 79 eV are attracted to either member 30a or 30b and are thus prevented from exiting analyzer 30. Only 79 eV electrons pass the analyzer through path 30c undisturbed and pass through the output guide 32.

Each of these 79 eV electrons is sensed and counted by an electron counter 35. Each 79 eV electron is also sensed as a pulse by a time-to-pulse height converter (TPC) 40. Also supplied to the latter, is a signal representing each photon detected by the standard photon detector 25, as represented by arrow head 26 on line 27 after a fixed delay, e.g. 100 μs, provided by a delay unit 42.

The function of each 79 eV electron supplied to TPC 40 is to start the measurement of a time period which ends when a delayed photon pulse is received by the TPC 40 from delay unit 42. As should be appreciated photons of different radiations, including 548 Å, may be received by the standard detector 25 and pass on to the TPC 40. The only photons which are of interest are the 584 Å photons which are emitted by those collisions which cause 79 eV electrons to scatter in the direction of $\theta=0$, and which are counted in counter 35 and supplied to TPC 40.

Since there is a known coincidence relationship or time correlation between 79 eV electrons at $\theta=0$ and 584 Å photons produced thereby, the time of arrival of each of these photons at TPC 40 (including the known delay by unit 42) after the arrival of a 79 eV at TPC 40 is known very precisely. Thus, the time measured by TPC 40 from the arrival of a 79 eV electron from $\theta=0$ to the arrival of a coincidence-related 584 Å photon is known and is designated $T_S$. This time period differs from any measured by TPC 40 after the arrival of a 79 eV electron from $\theta=0$ and the arrival of a photon of radiation, other than 584 Å, or a 584 Å photon emitted as a result of a 79 eV electron which scattered in a direction $\theta=0$.

Figure 2:
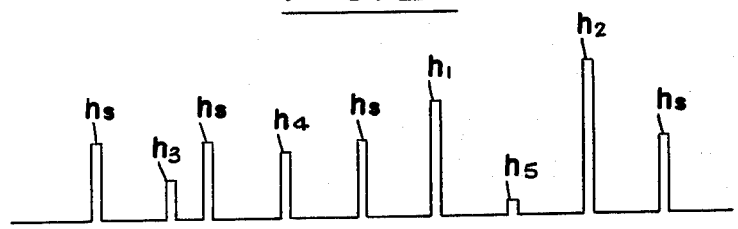
FIG. 2 is a diagram of pulses of different heights useful in explaining the operation of a time to pulse height converter (TPC) shown in FIG. 1.

The TPC 40, which is a commercially available instrument, provides a pulse of a height which is directly related to each measured time period. Its output is diagrammed for explanatory purposes in FIG. 2, wherein the pulses produced as a result of the times of arrival of 584 Å photons from 79 eV electron at $\theta=0$, are designated by $h_s$. Due to the time coincidence correlation, it should be apparent that these pulses are of equal height. As to the measured times, based on the arrival of other photons, after the arrivals of 79 eV electrons at $\theta=0$, they differ from $h_s$ and therefore the heights of the pulses from TPC 40, corresponding to these measured times, differ from the height of pulses $h_s$. They may be higher, as shown by pulses $h_1$ and $h_2$ or lower as represented by pulses $h_3$–$h_5$.

To separate these pulses, based on their heights, the pulses from TPC 40 are supplied to a pulse height analyzer (PHA) 50, which is also commercially available. Basically, PHA 50 acts as a multiple counter, providing a separate count for pulses of equal height. For the particular example of pulses shown in FIG. 2, it provides a separate count of all pulses of height $h_s$, a separate count of all pulses of height $h_1$, etc. For calibration purposes only the count of pulses of height $h_s$ is of interest since only these pulses indicate the 584 Å photons which passed through the standard photon detector 25 for 79 eV electrons at $\theta=0$.

From the foregoing, it should be appreciated that after a period of calibration, e.g. a second, a minute or more, the count in the electron counter 35 assumed to be $N_e$, actually represents the 584 Å photons generated by 79 eV electrons, scattered at $\theta=0$. However, out of $N_e$ number of photons, only a fraction will enter the standard photon detector 25. A factor K, which determines this fraction can be calculated very accurately. If $N_p$ represents the number of 584 Å detected during the calibration period, then the efficiency of the standard photon detector 25 may be expressed as $Eff_s$, where $Eff_s = N_p/kN_e$.

It should be stressed that once $Eff_s$ is determined precisely, for the standard photon detector for 584 Å photons, since the input solid angle of the standard detector 25 is known, it can serve as a standard for calibrating the efficiency of any other photon detector of a known input solid angle to 584 Å photons. This can be achieved by aligning the two detectors, i.e. the standard detector 25 and the detector to be calibrated, such as detector 55 along a straight line across the point of electrons-atoms collisions to insure that the input solid angles of the two detectors are aligned in directions in which equal numbers of photons such as 584 Å are emitted. This is based on the known fact that even though the distribution of photons is an-isotropic over a solid angle of 180°, the distribution has a mirror image in the other solid angle of 180°.

As shown in FIG. 1, the photon detector 55 to be calibrated, is positioned with its input solid angle $d\Omega_c$ along direction 19, which lies on a straight line across the electrons-atoms point of collision with direction 18.

Assuming that $d\Omega_c = d\Omega_s$, an equal number of photons of all radiation levels will be received by both detectors. It should be apparent that since $d\Omega_s$ and $Eff_s$ of the standard detector 25 to 584 Å photons is known and that the input solid angle $d\Omega_c$ of detector 55 is also known, its efficiency $Eff_c$ to 584 Å photons can be determined.

Figure 3:
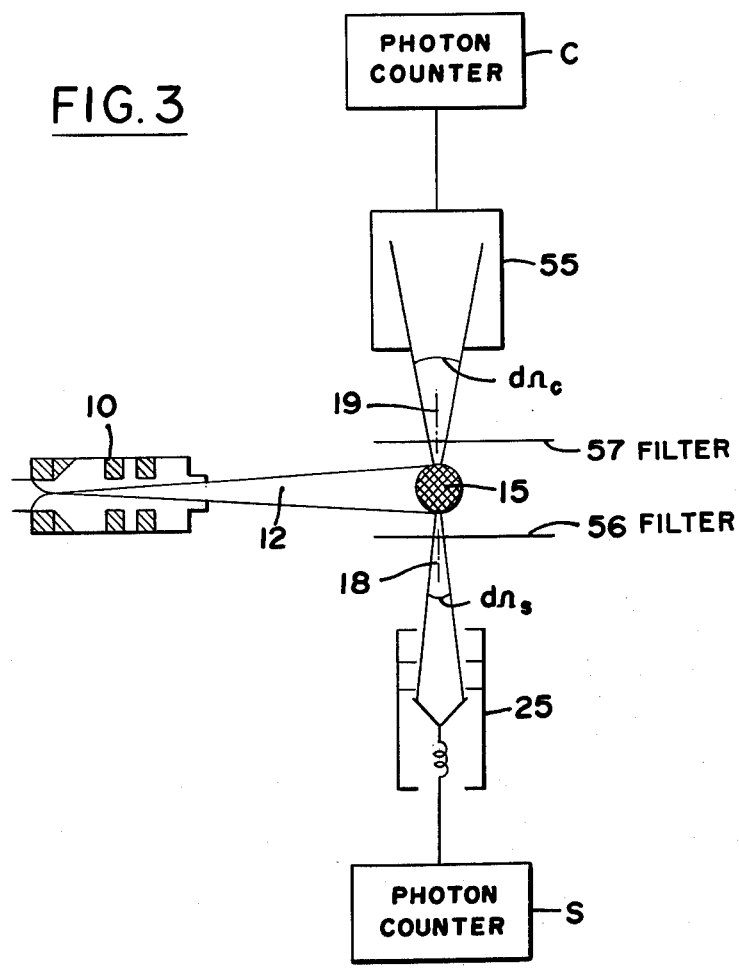
FIG. 3 is a diagram of an arrangement for calibrating a photon detector based on the known efficiency of a standard photon detector.

This can be achieved by insuring that only 584 Å photons reach the two detectors and by determining the numbers of 584 Å photons sensed by the two detectors. This aspect of the invention may best be explained in connection with FIG. 3, wherein elements, previously described, are designated by like numerals. To insure that only 584 Å photons reach the two detectors 25 and 55 appropriate filtering is employed. In FIG. 3, numerals 56 and 57 represent filters of all photons except 584 Å photons for the standard detector 25 and the detector 55 to be calibrated, respectively. Connected to the output of the standard detector 25 is a photon counter S. Similarly, a photon counter C is connected to the output of detector 55.

The function of each of these counters is to provide a count of all the photons which exited the detector to which it is connected. Due to filters 56 and 57, only 584 Å photons can reach the detectors. Thus, clearly only 584 Å photons can exit each detector and be counted. It should be pointed out that in the arrangement shown in FIG. 3, the 584 Å photons which reach each detector are not limited to those which are in coincidence correlation with 79 eV electrons at $\theta = 0$. 584 Å photons for 79 eV with $\theta \neq 0$ may be received by the detectors. However, even though detector 25 was initially calibrated for 584 Å photons of 79 eV electrons scattered at $\theta = 0$ and found to have an efficiency $Eff_s$, its efficiency is the same for all 584 Å photons.

After an appropriate calibration period, e.g. a minute, the accumulated counts or numbers in counters S and C are recorded. For explanatory purposes, these numbers are designated as $N_s$ and $N_c$ respectively. It should be apparent that $N_s$ represents the number of 584 Å which exited detector 25 and $N_c$ represents the number of 584 Å photons which exited the detector 55 over the same period. Since $Eff_s$, $d\Omega_s$ and $d\Omega_c$ are known, once $N_s$ and $N_c$ are obtained, the efficiency of the detector 55, designated $Eff_c$ is easily determinable, from the following simplified relationship.

$$Eff_c = (N_c/N_s)(d\Omega_s/d\Omega_c)Eff_s$$

It should be apparent that if the two input solid angles $d\Omega_s$ and $d\Omega_c$ are equal, then if $N_c = N_s$, $Eff_c$ equals $Eff_s$. On the other hand, with $d\Omega_s = d\Omega_c$, if $N_c \neq N_s$, the efficiency $Eff_c$ differs from $Eff_s$. It is greater than $Eff_s$, if $N_c > N_s$ and smaller if $N_c < N_s$. Likewise, if the two numbers $N_c$ and $N_s$ are the same, and the solid angles are different, $Eff_c$ does not equal $Eff_s$. It is greater than $Eff_s$ if $d\Omega_c < d\Omega_s$ and smaller if $d\Omega_c > d\Omega_s$.

The arrangement shown in FIG. 3 may be deemed to be quite advantageous to calibrate a photon detector, such as detector 55, suspected of having low transmission, since in the FIG. 3 arrangement 584 Å photons for all values of $\theta$, from 0° to 180°, reach the detectors. Thus, the calibration period may be shortened since a large number of 584 Å photons will reach each detector and the accumulated number $N_c$, would be reasonably large, even with detector 55 having low transmission. However, the invention is not intended to be limited thereto. If desired, the efficiency of photon detector 55 may be determined based on its output of 584 Å photons for 79 eV electrons scattered at $\theta = 0$. The arrangement for such an efficiency determination may best be appreciated by referring again to FIG. 1.

As shown in FIG. 1, the output photons of the detector 55, to be calibrated, are fed through a delay 42a which is identical to delay 42, to a TPC 40a, which is identical with TPC 40, and to which 79 eV electrons at $\theta = 0$ from guide 32 are supplied as they are to TPC 40. Delay 42a delays each photon from detector 55 by the same amount of delay, provided by delay 42 to each photon from the standard detector 42, e.g. 100 ns. As to TPC 40a it, like TPC 40, responds to each 79 eV electron at $\theta = 0$ and starts measuring a time until the arrival of a photon from delay 42a. The output of TPC 40a is similar to that of TPC, as previously explained, i.e. a sequence of pulses of different heights. (See FIG. 2) These pulses are fed to a PHA 50a which functions in a manner identical to that of PHA 50. That is, it provides counts for pulses of different heights. However, only the count or number related to the known coincidence correlation between 79 eV electron at $\theta = 0$ and 584 Å photons is used.

Each TPC-PHA arrangement can be viewed as separating 584 Å photons for 79 eV electrons at $\theta = 0$ from all other photons, which may have entered a detector and exited therefrom. Thus, each TPC-PHA arrangement serves as a filter, and therefore in the arrangement of FIG. 1, filters like filters 56 and 57 (See FIG. 3) are not required. It should also be pointed out that electron counter 35 is only used for determining the efficiency, $Eff_s$ of the standard photon detector 25. However, once $Eff_s$ is known, counter 35 is not required for the calibration of detector 55.

Let it be assumed that after a given calibration period, the numbers in PHA 50 and PHA 50a of 584 Å photons for 79 eV electrons at $\theta = 0$ are $N_s$ and $N_{c''}$, respectively. The efficiency of detector 55 can be expressed as:

$$(Eff_c/N_{c'}) = (Eff_s/N_s).$$

In the foregoing, the creation of a precise standard photon detector for use in calibrating another photon detector has been described in connection with specific atoms, electrons and photons. It was assumed that the atoms are He atoms, which are excited by collisions with electrons of 100 eV to emit 584 Å photons and scatter electrons of $100 - 21 = 79$ eV. The creation of the standard photon detector 25 i.e. the determination of its efficiency, was also described in connection with 79 eV electrons scattered at $\theta = 0$ and 584 Å A photons detected in a direction perpendicular to $\theta = 0$. It should be appreciated that the description was presented for explanatory purposes only, and not intended to limit the invention thereto.

The basic underlying principle of the invention is to create a standard photon detector, i.e., to determine its efficiency to photons of a particularly selected radiation level, 584 Å being one example, based on the coincidence relationship or time correlation between electrons which have lost a known amount of energy (e.g. 21 eV) when exciting particular atoms, and which were scattered in a particular direction, e.g. $\theta = 0$, with respect to particular photons emitted by the excited atoms in a selected direction with respect to the direction of scattering of the electrons of the reduced energy.

It should further be pointed out that even when determining the photon detector efficiency for 584 Å photons, scattered electrons at other than $\theta=0$ may be sensed, with 584 Å photons emitted at other than $\theta=90°$ being detected. Also, the invention is clearly not intended to be limited to determining the efficiency of a photon detector for use as a standard with respect to 584 Å photons, which are in the VUV region. For example, Ar atoms may be bombarded by an electron beam to emit 1048 Å photons in the UV region by sensing electrons which have lost 10.83 eV, from their original energy, prior to the collisions with the Ar beam. Likewise, atoms of Kr, Xe, Ne or of other gases may be used to calibrate a photon detector for photons at radiation levels of 1165 Å, 1470 Å and 735 Å.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. An arrangement for calibrating a photon detector of a known input solid angle to determine its efficiency to particular photons in a selected region of the spectrum, the arrangement comprising:

means for directing a beam of electrons of a predetermined energy, definable as xeV in a first direction;

means for directing a beam of selected atoms in a direction perpendicular to said first direction, whereby when electrons of said beam collide with said atoms, at least some of the atoms are excited to emit said particular photons of known wavelength radiation, definable as nÅ, and the electrons exciting said atoms lose a known amount of energy, definable as yeV and scatter with an energy of zeV where $z=(x-y)$, said zeV electrons scattering in directions which form different angles definable as $\theta$ with a direction aligned with the direction of the electron beam;

a photon detector positioned with its input solid angle in a direction in which photons are emitted, including nÅ photons which were emitted as a result of collisions of some of said atoms with electrons, which scattered in a direction wherein $\theta=m°$, with an energy of ZeV;

electron analyzer means positioned for receiving electrons scattered in the direction of $\theta=m°$ and for separating from said received electrons the electrons with remaining energy of zeV; and selection means responsive to the zeV electrons from said electron analyzer means and photons detected by said photon detector for providing a count of the number of zeV electrons from said electron analyzer means and for providing a separate count of only those nÅ photons detected by said photon detector which were emitted as a result of collisions which resulted in said zeV electrons scattered in the direction of $\theta=m°$.

2. An arrangement for calibrating a photon detector as described in claim 1 wherein said selection means include first means responsive to each zeV electron from said electron analyzer means and to each photon detected by said photon detector for producing a pulse having a particular property which is related to the time difference between the arrival time of a zeV electron from said electron analyzer means and the subsequent arrival time of a photon detected by said photon detector and second means for producing at least a count related to the time difference of those pulses which are related to the time differences between the arrival times of zeV electrons and subsequent arrival times of nÅ photons.

3. An arrangement for calibrating a photon detector as described in claim 2 wherein said first means of said selection means provide pulses of heights, related to said time differences, said second means produce separate counts for pulses of the same corresponding heights, said second means producing one count for pulses of the same height which is related to the known coincidence correlation between the time of arrival of a zeV electron and an nÅ photon emitted by the collision of said electron with an atom which released said nÅ photon.

4. An arrangement for calibrating a photon detector as described in claim 2 wherein said first means of said selection means provide pulses of heights related to said time differences, and said second means produce separate counts for pulses of the same corresponding heights, said second means producing one count for pulses of the same height which is related to the known coincidence correlation between the times of arrival of a zeV electron and an nÅ photon emitted by the collision of an electron with an atom which released said nÅ photon, and scattered said zeV electron at $\theta=m°$.

5. An arrangement for calibrating a photon detector as described in claim 1 wherein nÅ is in the ultra-violet (UV) region.

6. An arrangement for calibrating a photon detector as described in claim 1 wherein nÅ is in the vacuum ultra-violet (VUV) region.

7. An arrangement for calibrating a photon detector as described in claim 6 wherein n is less than 1000.

8. An arrangement for calibrating a photon detector as described in claim 7 wherein n=584.

9. An arrangement for calibrating a photon detector as described in claim 1 wherein the atoms are helium (He) atoms and n=584.

10. An arrangement for calibrating a photon detector as described in claim 9 wherein z=78.8.

11. An arrangement for calibrating a photon detector as described in claim 10 wherein m=0.

12. A method of creating a standard photon detector of a known input solid angle by determining its efficiency to nÅ photons, the method comprising:

causing a beam of electrons of an energy xeV to collide with a beam of selected atoms so that at least some of the atoms are excited by bombarding electrons and emit nÅ photons, with the electrons exciting said atoms losing yeV, whereby electrons with energy of zeV are scattered, where $z=x-y$;

sensing only zeV electrons scattered in a particular direction in a selected time period;

providing a count for said sensed electrons;

positioning a photon detector in a direction in which nÅ photons are known to be emitted; and determining the number of nÅ photons detected by said photon detector and which were emitted only by said zeV electrons whose number has been determined, based on the known coincidence correlation between the time of nÅ detection by said detector.

13. A method for calibrating a photon detector as recited in claim 12 wherein the number of the nÅ photons is determined by using each sensed zeV electron to start the measurement of a time interval which ends when a photon is detected by said detector and providing a count of those time intervals which relate to the known coincidence correlation between each sensed zeV electron and each nÅ photon sensed by said detector, which was emitted as a result of the collision between said electron and an atom which emitted said nÅ photon.

14. An arrangement for calibrating a photon detector of a known input solid angle to determine its efficiency to particular photons in at least the ultra-violet (UV) or vacuum ultra-violet (VUV) regions of the spectrum, the arrangement comprising:
  means for directing a beam of electrons of a predetermined energy, definable as xeV in a first direction;
  means for directing a beam of selected atoms in a direction perpendicular to said first direction, whereby when electrons of said beam collide with said atoms, at least some of the atoms are excited to emit said particular photons of known wavelength radiation definable as nÅ, and the electrons exciting said atoms lose a known amount of energy, definable as yeV and scatter with an energy of zeV where $z=(x-y)$, said zeV electrons scattering in directions which form an angle with a direction aligned with the direction of the electron beam, and said nÅ photons are emitted with equal probability in first and second opposite directions;
  a standard photon detector with a known input solid angle, and efficiency to nÅ photons positioned with its input solid angle in said first direction in which photons are emitted including nÅ photons, which were emitted as a result of collisions of some of said atoms with electrons, which photons scattered in a direction $\theta$ with an energy of zeV;
  a first photon detector of a known input solid angle positioned in said second direction, for receiving photons during a selected calibration period which were scattered in a direction opposite to $\theta$;
  electron analyzer means for detecting selecting electrons of an energy zeV which scatter in a predetermined direction; and
  first selection means responsive to the zeV electrons from said electron analyzer means and photons detected by said standard photon detector for providing a count of the number of nÅ photons detected by said standard photon detector during said calibration period and which were in coincidence correlation with the zeV electrons from said electron analyzer means, whereby the efficiency of said first photon detector to nÅ photons is a function of the known efficiency of said standard photon detector to nÅ photons, the input solid angles of said standard and first photon detectors, and the number of nÅ photons detected by said standard and first photon detector means.

15. An arrangement for calibrating a photon detector as described in claim 14 wherein said electron analyzer means includes first and second selection means, each selection means responsive to each zeV electron from said said electron analyzer means and to each photon detected by the photon detector to which it is connected for producing a pulse having a particular property which is related to the time difference between the arrival time of a zeV electron from said electron analyzer means and the subsequent arrival time of a photon at the photon detector that the selection means is connected to, and including second means for producing a count of pulses related to the time intervals between the arrival of zeV electrons scattered at $\theta=\theta_i$ and nÅ photons at the associated photon detector which were emitted as a result of collisions, resulting in electrons of zeV being scattered at $\theta=\theta_i$.

16. An arrangement for calibrating a photon detector as described in claim 15 wherein said second means provides pulses of heights related to said time differences for each selection means, said second means produces separate counts for pulses of the same corresponding heights, said second means producing one count for each pulse of the same height which is related to the known coincidence correlation between the times of arrival of a zeV electron and a nÅ photon at a corresponding photon detector, emitted by the collision of an electron with an atom which released said nÅ photon, and scattered said zeV electron at $\theta=\theta_i$.

17. An arrangement for calibrating a photon detector as recited in claim 14 where said electron analyzer selects electrons scattered along a direction in line with said beam of electrons of energy xeV.

18. An arrangement for calibrating a photon detector as recited in claim 14 wherein nÅ is the UV region.

19. An arrangement for calibrating a photon detector as recited in claim 14 wherein nÅ is in the VUV region.

20. An arrangement for calibrating a photon detector as recited in claim 19 wherein n is less than 1000.

21. An arrangement for calibrating a photon detector as recited in claim 20 where nÅ=584 Å.

22. An arrangement for calibrating a photon detector as recited in claim 14 wherein the atoms are helium (He) atoms and n=584.

23. An arrangement for calibrating a photon detector as recited in claim 22 where z=78.8.

24. An arrangement for calibrating a photon detector as described in claim 23 where $\theta=0$.

* * * * *